Sept. 18, 1934. J. R. CALDWELL 1,973,748
SHOE SOLE OR THE LIKE AND PROCESS OF MANUFACTURING SAME
Filed Nov. 6, 1933
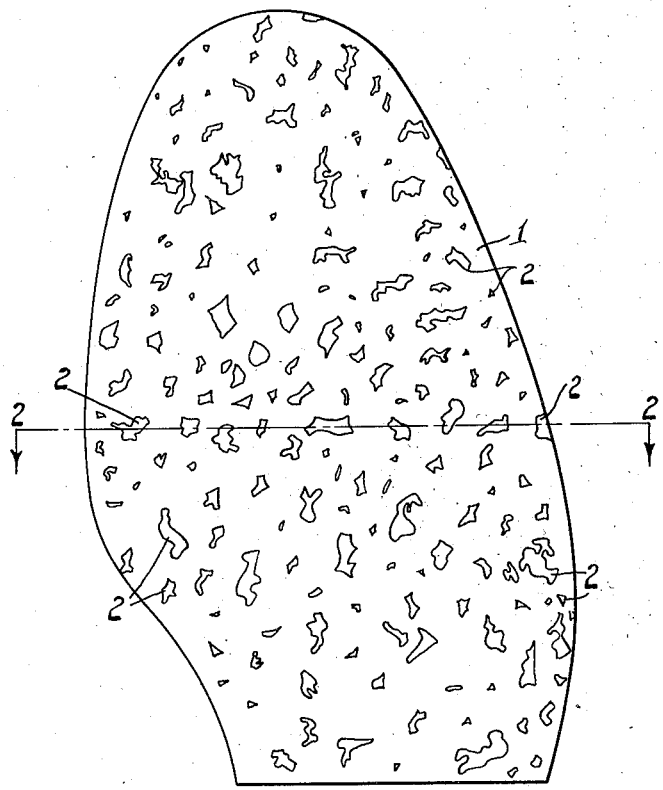
INVENTOR
JOHN R. CALDWELL
BY
ATTORNEYS Patented Sept. 18, 1934

1,973,748

UNITED STATES PATENT OFFICE 1,973,748

SHOE SOLE OR THE LIKE AND PROCESS OF MANUFACTURING SAME

John R. Caldwell, Akron, Ohio

Application November 6, 1933, Serial No. 696,758

9 Claims. (Cl. 18—59)

The present invention relates to a new and improved article of rubber and the process of making the same. While specifically shown and described for the manufacture of rubber shoe soles, the invention is useful in other and more extended fields. It may be employed in the manufacture of stair treads, floor coverings or other articles where non-slipping surfaces are desired.

The present invention was originated for the purpose of improving upon rubber soles such as worn on sport shoes. In shoes of this type the non-skid surface is usually provided by the presence of deep, non-skid surfaces or irregularities. When these surfaces wear down, however, the sole is smooth and consequently dangerous. It was for the purpose of designing a sole which would retain its non-slipping properties at all times that the present invention was devised, the result being a sole much superior to known soles and which even increases in non-slipping properties after use and wear.

The invention, insofar as the non-slipping, long wearing rubber stock is concerned, consists in providing a main body of rubber with blocks or spots of rubber which are more resistant to abrasion, but the incorporation of two stocks so that each retains its known and desired properties and at the same time is thoroughly amalgamated with the other presented a very considerable problem, it having been impossible prior to my invention, so far as my knowledge is concerned, to attain these objects. In cases where an abrasion resisting rubber is incorporated in one which is not so highly abrasion resistant, if the former does not lose its identity it is not firmly embedded and may easily loosen and separate from the main body.

It was a problem, therefore, to devise some method by which the two stocks could be combined and in which there would be no separation or tendency to separate at the lines of meeting of the two stocks. No prior worker in this field had apparently been able to solve this problem.

It will be understood that while the invention is to be shown and described as applied to shoe soles, it is evident that having explained the same, its usefulness may be extended to other fields than those mentioned. It will also be understood that the attached description is for the purpose of explaining the best known method of practising the same and for this purpose is directed to the skilled worker in the art. As such it is explanatory merely and is not limited to exact conformity with the detailed showing which is made.

In the drawing accompanying this application:

Figure 1 is a plan view of a shoe sole such as made by me in practising the invention; and Figure 2 is an enlarged section on the line 2—2 of Figure 1.

In the showing here made, the main body 1 of the sole is made from any usual or well known sole compound. These compounds are usually a cheap grade of rubber stock, have little abrasion resisting properties, and disintegrate and chip from extended use. As ordinarily used, these are heavily embossed to provide non-slipping surfaces, but for the reasons given these surfaces wear away rapidly. The main body of my shoe sole may be plain, as the non-skidding properties are otherwise secured, although non-skid surfaces may be molded on the sole if desirable.

Throughout the sole are scattered flecks or blocks of a rubber which is highly abrasion resisting. These flecks or spots are indicated at 2 and are scattered over the surface in more or less profusion, depending upon the individual preferences of the manufacturer. For the purpose of making the improved sole, I have selected a high grade tire tread stock which has extreme wear and abrasion resisting properties. Of course, other stocks having similar or substantially like properties may be substituted. A rubber sole of this structure will not become slippery in use, for as the body 1 wears away the flecks or particles 2 will not wear so rapidly and will project slightly from the surrounding body of the sole and present numerous scattered, irregular, knob-like projections which grip the surface of the ground and prevent slipping. This property instead of diminishing with the wear of the shoe will increase as the body of the sole wears away. In the sole which I have perfected, the flecks 2 are securely anchored and amalgamated in the rubber, and while they are easily distinguishable in the body of the sole, there is absolutely no fracture or cleavage between the main body and the spots or flecks of the more highly abrasion resistant stock. Such result makes it impossible for the flecks 2 to break loose. In fact, upon tests the rubber will break or tear across the junction lines of the two stocks. The diversity of shape and irregular surfaces of the flecks 2 contribute to their firm anchorage in the stock, but the result is primarily attributable to the method of manufacture which will be disclosed.

In making this material, the usual or standard tire tread stock, formulas of which are known to every rubber chemist, are employed. The stock, to carry out my invention, should be compounded with a slow accelerator, that is to say, one which will give a slow cure but will not set up the stock until just as the cure is near completion. The use of the proper accelerator is an important feature of the invention. A number of accelerators having this property may be used, and a rubber chemist having been given the desired result can choose any one which is available. I have found that the guanidines are useful in this connection, having used diphenylguanidine for that purpose, for the reason that this accelerator is definitely a slow accelerator and the stock is not "set up" until just prior to complete curing. In practising the invention, a stock of the character described is made up usually in the form of a slab and subjected to vulcanization, but just prior to the point where full vulcanization is reached and where the stock can be removed, it is taken out of the mold. This is the stock 2.

A batch of the stock 1 is prepared on the mill and brought to a point just short of complete milling. The stock 2, taken from the mold, is thrown onto the mill and the two stocks milled together for the short period required for the completion of the milling of stock 1. This operation serves to break up and distribute the stock 2 throughout the stock 1 in the flecks or particles substantially as shown. The degree of dispersion or scattering of the stock 2 and the size of the particles are determined by the time of milling of both stocks, the distance between the rolls and other factors within the control of the mill man. It will be found that a wide variety of effects can be secured by changing the usual milling factors.

In any event, after the stocks have been milled together for a brief interval, so that the stock 2 is broken up and scattered through the stock 1, the compounded stock is taken off the mill and cut and formed into molded shoe soles in the usual way. In the cure or in the milling, the two stocks firmly amalgamate, although neither penetrates the other and the clear line between both is observable. However, no cleavage between the stocks is possible, the flecks 2 being incapable of separation or removal. The flecks cannot be picked out of the sole, nor will they separate even under the most severe tests.

What is claimed is:

1. A stock for use in making shoe soles or similar articles, consisting of a body of non-abrasion resistant rubber and flecks of abrasion resistant rubber scattered through the first named stock and vulcanized and amalgamated therewith without line of separation or cleavage between the stocks.

2. A stock for use in making shoe soles or the like, comprising a main body of the usual non-abrasion resistant sole stock and irregular particles of a highly abrasion resistant rubber stock scattered through the first named stock and offering numerous, spaced, wear-resisting areas, the said stocks being amalgamated and vulcanized together so that no separation or cleavage between said stocks is obtainable.

3. The process of making a rubber article having a non-slipping surface, comprising milling a body stock of a non-abrasion resistant character until milling is substantially completed, adding to such stock a slab of a more highly abrasion resistant stock which has been brought to substantially complete cure without setting up and completing the milling of said stocks whereby the latter is broken up and distributed in scattered, irregularly shaped particles throughout the former, forming the article from such compounded stock, and bringing the whole to a complete cure.

4. The process of preparing a stock for a rubber article having non-slipping, wear-resisting surfaces, comprising milling a low grade rubber stock to form a body stock which possesses low abrasion resisting qualities, compounding a second stock of high abrasion resisting qualities with a slow accelerator which does not "set up" the stock until just prior to complete curing, vulcanizing such stock to a point where it can be removed from a mold, adding the second stock to the first stock during the milling operation just prior to the completion thereof, and completing the milling of such stocks together whereby the second named stock breaks up into small particles distributed throughout the first named stock.

5. The process of preparing a stock for a rubber article having non-slipping, wear-resisting surfaces, comprising milling a low grade rubber stock to form a body stock which possesses low abrasion resisting qualities, compounding a second stock of high abrasion resisting qualities with a slow accelerator of the class of diphenylguanidine, vulcanizing such stock to a point where it can be removed from a mold, adding the second stock to the first stock during the milling operation just prior to the completion thereof, and completing the milling of such stocks together whereby the second named stock breaks up into small particles distributed throughout the first named stock.

6. The process of dispersing a high-grade abrasion resisting rubber stock throughout a different rubber stock comprising curing a slab of the first named stock to substantially complete vulcanization but to a point where it may still be broken up in a mill, adding such stock in slab form to the second named stock, while the same is uncured and milling for a sufficient interval to provide a milled stock through which the first named stock is scattered in small irregular particles.

7. The process of dispersing a high-grade abrasion resisting rubber stock throughout a different rubber stock comprising curing a slab of the first named stock to substantially complete vulcanization but to a point where it may still be broken up in a mill, adding such stock to a batch of the second named stock which has been partially milled, and milling for a sufficient interval to provide a milled stock through which the first named stock is scattered in small irregular particles.

8. The process of making rubber goods in which particles of one rubber stock are dispersed through another for the uses and purposes set forth, comprising adding a substantially completely vulcanized stock in slab form to a substantially completely milled stock, completing the milling of said stocks together, and vulcanizing the stocks together.

9. The process of making a shoe sole or the like composed of a body stock of a low grade rubber and particles of a high grade rubber scattered therethrough but amalgamated therewith, comprising adding the high grade stock partially cured to the body stock while on the mill, continuing the milling until the high grade stock is broken up and distributed through the body stock, and milling and curing the stocks together.

JOHN R. CALDWELL.